United States Patent [19]

Amodeo

[11] Patent Number: 5,779,408
[45] Date of Patent: Jul. 14, 1998

[54] FLUID CONTROL QUILL STOP

[76] Inventor: Joseph J. Amodeo, 31 Janis Way, Unit D, Scotts Valley, Calif. 95066

[21] Appl. No.: 796,240

[22] Filed: Feb. 6, 1997

Related U.S. Application Data

[60] Provisional application No. 60/011,384 Feb. 9, 1996.
[51] Int. Cl.[6] .................................................. B23C 1/12
[52] U.S. Cl. ........................... 409/218; 408/56; 408/61; 408/137; 408/202; 408/241 S; 409/135; 409/136; 409/184; 409/210; 409/214
[58] Field of Search ........................... 408/56, 61, 14, 408/137, 202, 241 S; 409/135, 136, 184, 210, 214, 218

[56] References Cited

U.S. PATENT DOCUMENTS

| | | | |
|---|---|---|---|
| 3,689,168 | 9/1972 | Persson | 408/61 |
| 3,724,964 | 4/1973 | Needham, Jr. | 408/14 |
| 4,076,443 | 2/1978 | Halpern | 408/202 |
| 4,330,052 | 5/1982 | Schymick | 408/14 |
| 4,521,144 | 6/1985 | Ginter | 409/218 |
| 4,787,794 | 11/1988 | Guthrie | 411/433 |
| 4,978,261 | 12/1990 | Wright, III | 409/218 |
| 5,092,717 | 3/1992 | Fischer | 408/202 |
| 5,106,242 | 4/1992 | Obrecht et al. | 409/218 |
| 5,127,775 | 7/1992 | Broadbent et al. | 409/218 |
| 5,228,489 | 7/1993 | Werber et al. | 409/184 |
| 5,332,341 | 7/1994 | Arai et al. | 408/61 |
| 5,382,120 | 1/1995 | Parsons | 408/202 |

*Primary Examiner*—A. L. Pitts
*Assistant Examiner*—Christopher Kirkman
*Attorney, Agent, or Firm*—Richard C. Litman

[57] ABSTRACT

A quill stop for a milling machine, drill press, or other like machine. The quill stop includes means for automatic control of coolant flow. The quill stop includes a passage through which high pressure air flows. A valve in the passage controls the air flow. The valve is activated by contact of the quill stop with a dog stop on the machine. The quill stop may also include a self contained mist unit activated by the valve.

19 Claims, 5 Drawing Sheets

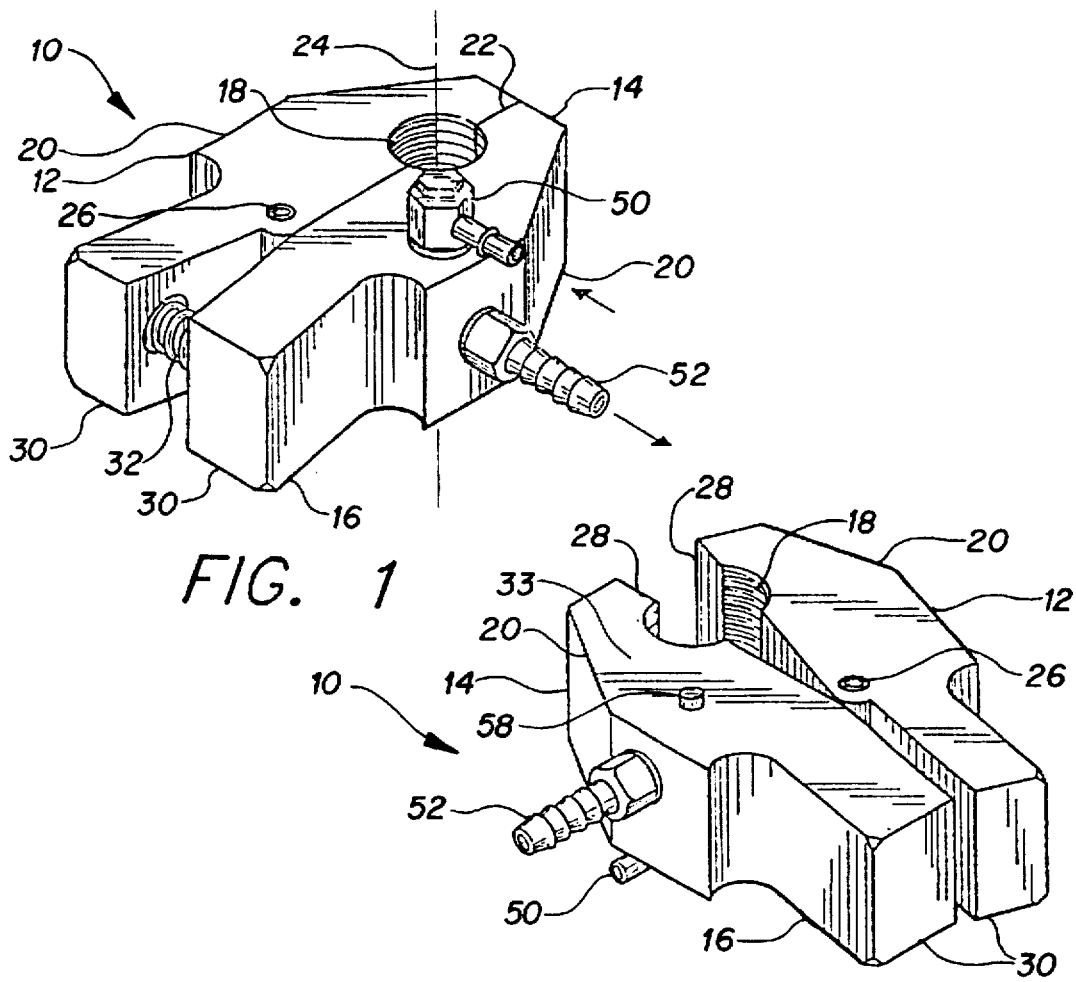
FIG. 1
FIG. 2
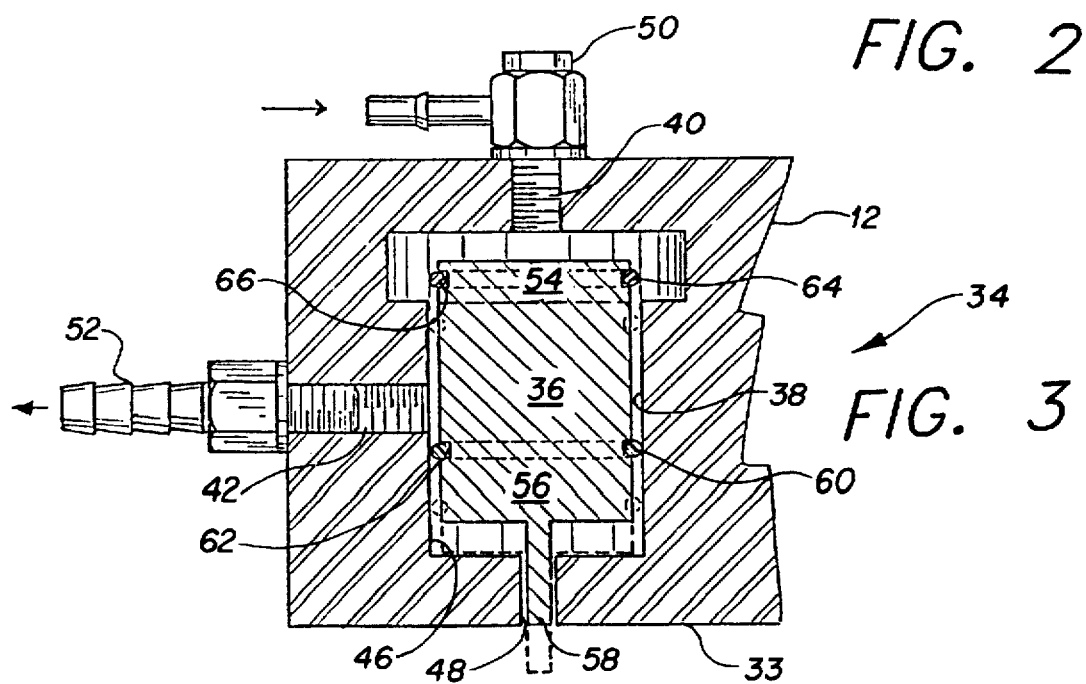
FIG. 3

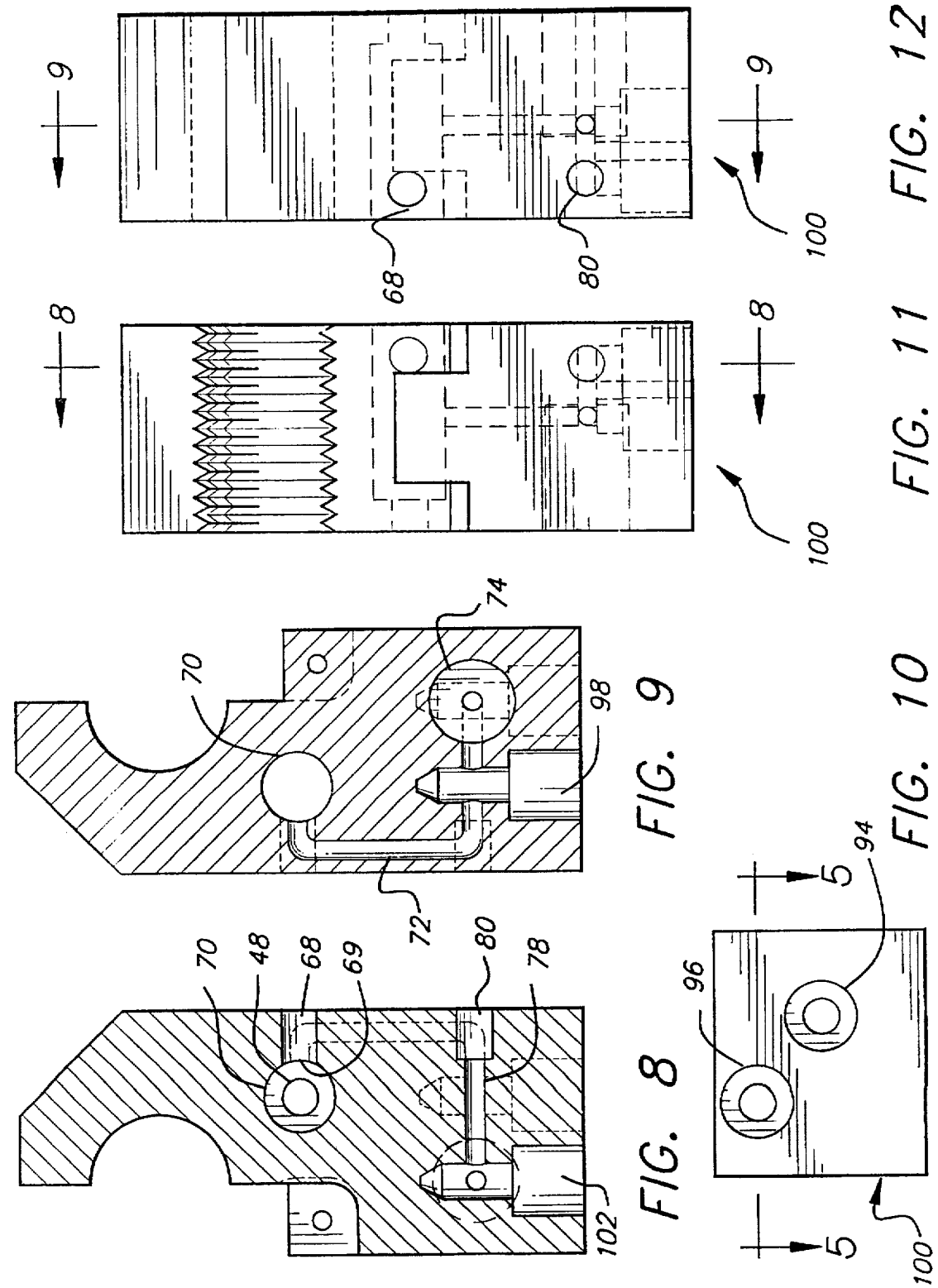

FLUID CONTROL QUILL STOP

CROSS-REFERENCE TO RELATED APPLICATION

This application claims the benefit of U.S. Provisional Patent Application Ser. No. 60/011,384, filed Feb. 9, 1996.

BACKGROUND OF THE INVENTION

1. Field of the Invention

The present invention relates to quill stops for drilling, milling or like machines.

2. Description of the Prior Art

Many drill press, milling and other like machines use an adjustable quill stop. An example of such a machine is the standard Bridgeport vertical milling machine. Such a machine includes a threaded stop rod on which the quill stop is selectively positioned. For any operation of the machine, the maximum displacement of the quill is controlled by positioning a quill stop on the stop rod. The displacement of the quill is restricted by contact of the quill stop with a dog stop on the machine.

Quill stops typically include a threaded bore for engaging the stop rod of the machine. The position of a quill stop may, thus, be altered by rotating the quill stop on the rod. This method of adjustment has been found to be particularly inefficient when the stop must be frequently moved between short production runs. Quill stops have thus been developed to provide for rapid macro adjustment of the quill stop by providing for the disengagement of the threads of the stop rod and the threads of the quill stop. Prior art examples of such quill stops include U.S. Pat. No. 4,521,144 issued Jun. 4, 1985 to C. A. Ginter, U.S. Pat. No. 4,787,794 issued Nov. 29, 1988 to G. Guthrie, and U.S. Pat. No. 4,978,261 issued Dec. 18, 1990 to C. O. Wright, III.

The operation of drilling, milling and the like may require that the work piece or machine components be cooled. Mist type cooling systems are commonly employed with such machines. A high pressure gas, typically air, is combined with a liquid coolant to produce a cooling mist directed at the part to be cooled. A valve for controlling the supply of the high pressure gas may be included in such a system to provide for intermittent or selective cooling. These valves are currently manually operated.

The prior art quill stops do not provide means for controlling coolant flow. Therefore, the above inventions and patents, taken either singly or in combination, are not seen -to describe the instant invention as claimed.

SUMMARY OF THE INVENTION

The present invention provides a quill stop including means for controlling a cooling system. The operation of a cooling system is activated by contact of the quill stop with a dog stop on a machine.

The quill stop can be selectively positioned on a stop rod of a machine. A bore though the quill stop includes threads for engaging the mating threads of the stop rod on the machine. Means are provided for disengaging the threads of the quill stop from the mating threads of the stop rod to provide for rapid positioning of the quill stop.

The quill stop includes a valve for insertion in a high pressure gas supply line of a mist type cooling system. The valve is biased in a closed position by the pressure of the gas supplied to the valve inlet. A button protrudes from the surface of the quill stop which contacts the dog stop on the machine. Upon contact of the quill stop with the dog stop, the button is depressed. Depressing the button opens the valve allowing the high pressure gas to flow while the quill stop is in contact with the dog stop. The high pressure gas is mixed with a coolant to produce a cooling mist when the valve is open. When contact between the quill stop and the dog stop is broken, the valve is closes, thereby halting the flow of the high pressure gas.

The quill stop may also include other components of the cooling system. The high pressure gas and cooling liquid may be brought together in the quill stop. Valves controlling the flows of high pressure gas and cooling liquid may be integrated within the quill stop. A nozzle for mixing the liquid coolant with the high pressure gas may also be integrated with the quill stop.

The instant quill stop provides for automatic control of a cooling system. The quill stop is positioned such that when the quill of the machine reaches its maximum desired displacement, the quill stop contacts a dog stop and the coolant flow is actuated.

Alternatively, the quill stop may be reversed to contact a stop when the quill is in a fully retracted position. In the reversed position, coolant flow is actuated by contact with the quill stop when the quill is in a fully retracted position.

Accordingly, it is a principal object of the invention to provide a quill stop including means for automatically controlling a cooling system.

It is another object of the invention to provide a quill stop which is rapidly and conveniently positioned on the stop rod of a machine.

It is a further object of the invention to provide a quill stop which alternatively provides coolant flow when a quill is either in a fully retracted position or in a fully extended position.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is a top perspective view showing the invention in a closed position.

FIG. 2 is a bottom perspective view showing the invention in an open position.

FIG. 3 is a sectional view through the valve portion of the invention.

FIG. 8 is a section view taken along line 8—8 of FIG. 11.

FIG. 9 is a section view taken along line 9—9 of FIG. 12.

FIG. 10 is an rear end view of the part shown in FIG. 4.

FIG. 11 is a left side elevational view of the part shown in FIG. 4.

FIG. 12 is a right side elevational view of the part shown in FIG. 4.

Similar reference characters denote corresponding features consistently throughout the attached drawings.

DETAILED DESCRIPTION OF THE PREFERRED EMBODIMENTS

Figure 4:
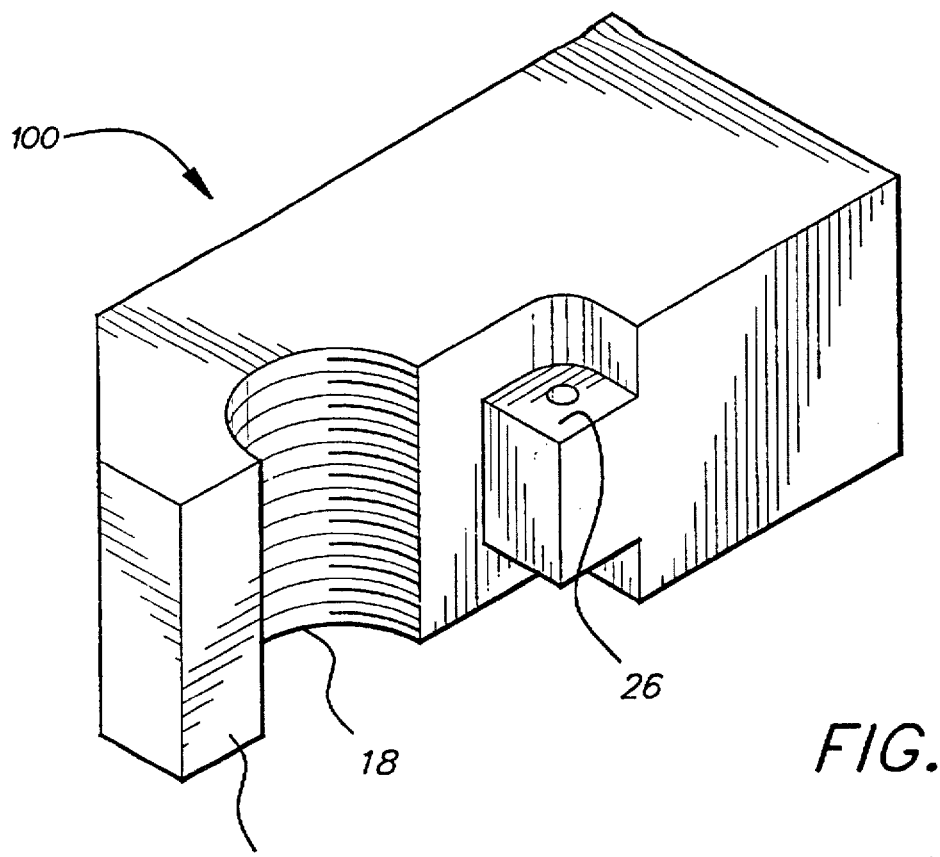
FIG. 4 is top perspective view showing one part of an alternate embodiment of the invention including a self contained mist unit.
Figure 5:
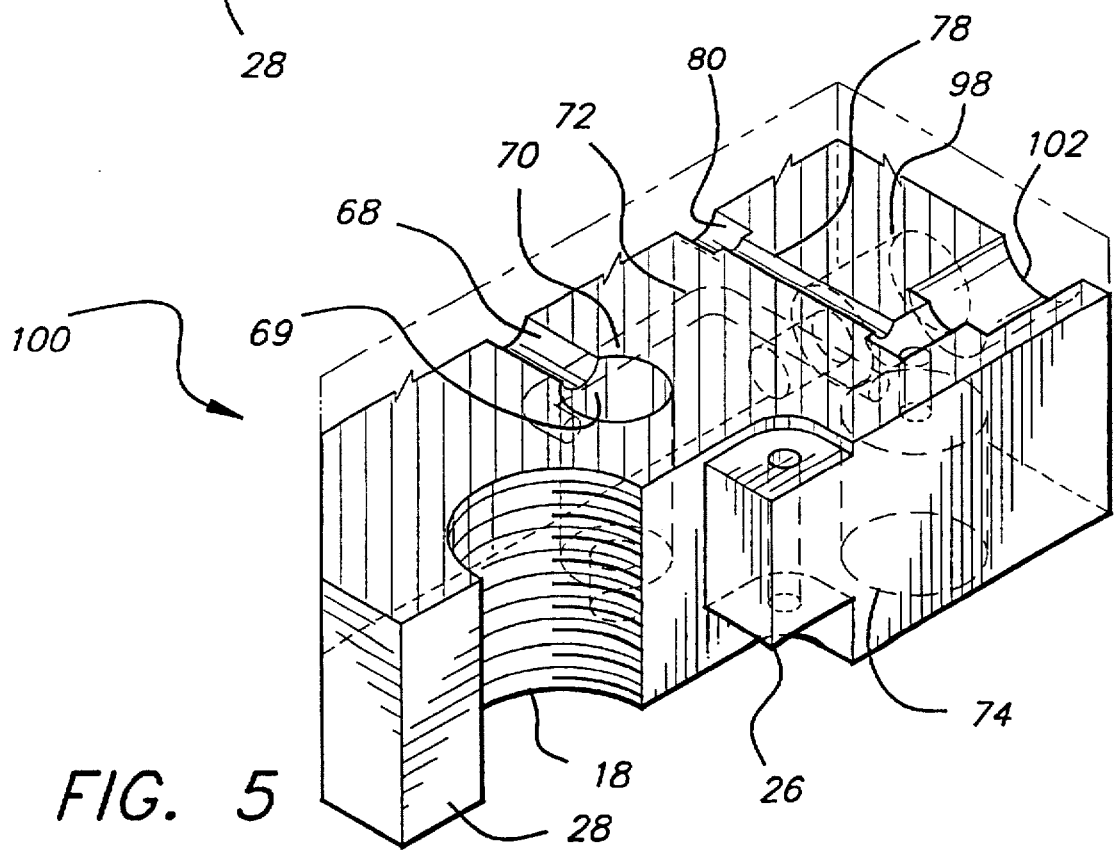
FIG. 5 is a perspective view of the alternate embodiment with the top cut away showing the internal structure without external attachments as shown in FIG. 10.

A quill stop 10 is shown in FIGS. 1 and 2. Quill stop 10 comprises a body 12. Body 12 has a tip 14 and a tail end 16. A threaded bore 18 passes through body 12. Threaded bore 18 provides means for attaching quill stop 10 to a threaded stop rod on a machine. The body 12 shown is machined from aluminum.

Body 12 is divided into two parts 20 along a plane 22. Plane 22 contains the central axis 24 of threaded bore 18. The two parts 20 are joined by pivot 26. Parts 20 meet along faces 28. Each face 28 includes half of threaded bore 18. Each part 20 further includes a tail 30 extending generally away from pivot 26 to tail end 16. Tails 30 are configured with a gap between them. A spring 32 is disposed in the gap between tails 30. Spring 32 biases tails 30 apart and thus forces faces 28 together.

Quill stop 10 restricts the motion of a quill on the machine. Quill stop 10 is positioned on the stop rod of a machine such that a stopping surface 33 engages a dog stop of the machine when the quill reaches a selected maximum displacement. The clamp configuration of body 12 provides means for releasably attaching quill stop 10 to a stop rod of a machine. Tails 30 are forced together to open tip 14 which is placed over the stop rod of a machine. The threads of bore 18 engage the threads of the stop rod when tails 30 are released. By this method, quill stop 10 may be rapidly positioned at any desired position on the stop rod of a machine.

As shown in FIG. 3, a control valve 34 is provided in body 12 for controlling the flow of high pressure gas in a spray mist cooling system. Control valve 34 comprises a cylindrical valve element 36 disposed in a cylindrical valve cavity 38. Valve cavity 38 includes an inlet 40 and an outlet 42. Inlet 40 is in communication with a wide fluid passage chamber 44 of valve cavity 38. Outlet 42 is in communication with a narrow element chamber 46 of valve cavity 38. Also in communication with element chamber 46 is button passage 48. Button passage 48 passes through stopping surface 33. An inlet hose fitting 50 is screwed into inlet 40. An outlet hose fitting 52 is screwed into outlet 42.

Valve element 36 has a first end 54 and a second end 56. A button 58 extends from second end 56. Valve element 36 is slidably disposed within element chamber 38. Button 58 is arranged to extend through button passage 48 and protrude from stopping surface 33. Valve element 36 has an outer diameter sufficiently similar to the inner diameter of element chamber 46 to allow a first O-ring 60, which encircles valve element 36, to form a seal between valve element 36 and the inner side wall of element chamber 46. First O-ring 60 provides a seal in element chamber 46 which prevents air flowing from inlet 40 to outlet 42 from escaping through button passage 48. First O-ring 60 is seated in groove 62 formed in valve element 36. A second O-ring 64 encircles first end 54. Second O-ring 64 is seated in groove 66 formed in valve element 36.

Upon contact of stopping surface 33 with a dog stop on a machine, button 58 is depressed. The depression of button 58 forces valve element 36 into the open position shown in FIG. 3. In the open position, first end 54 is forced into fluid passage chamber 44. Fluid passage chamber 44 has a large diameter precluding second O-ring 64 from forming a seal. Air, therefore, flows from inlet 40 to outlet 42 through control valve 34. When the contact between stopping surface 33 and the dog stop on the machine is broken, the high pressure air entering inlet 40 forces valve element 36 into the closed position shown in dashed lines. In the closed position, end 54 is contained within element chamber 46 such that second O-ring 64 forms a seal between valve element 36 and the inner wall of element chamber 46. The seal provided by second O-ring 64 prevents air from flowing from inlet 40 to outlet 42 through control valve 34 when button 58 is released.

In an alternate embodiment, a self contained mist unit may be included in part 100 of the quill stop shown in FIGS. 4–13. The part 100 replaces the part 20 shown in FIG. 1 that includes control valve 34. The quill stop including part 100 includes the same means for attaching to a stop rod as described above.

Part 100 also includes a control valve. The control valve comprises a valve element 36 as shown in FIG. 3. The valve element 36 is slidably disposed in cylindrical valve cavity 70 shown in FIG. 5. A gas inlet 68 is in fluid communication with valve cavity 70 for supplying high pressure air to the control valve. An outlet passage 72 is in fluid communication with valve cavity 70 and an outlet 74. Also in communication with valve cavity 70 is button passage 48 though which button 58 passes. An inlet hose fitting 76 is screwed into gas inlet 68.

Upon contact of stopping surface 33 with the dog stop of the machine, button 58 is depressed thus sliding valve element 36 within valve cavity 70. Gas inlet 68 enters valve cavity 70 through the inner side wall 69 which is in contact with O-ring 64. Gas inlet 68 is positioned such that O-ring 64 is located between gas inlet 68 and outlet passage 72 when button 58 extends from stopping surface 33. Upon depression of button 58, valve element 36 is slid within valve cavity 70. As valve element 36 is slid, O-ring 64 passes across gas inlet 68 to permit high pressure gas to flow from gas inlet 68 to outlet passage 72.

Figure 13:
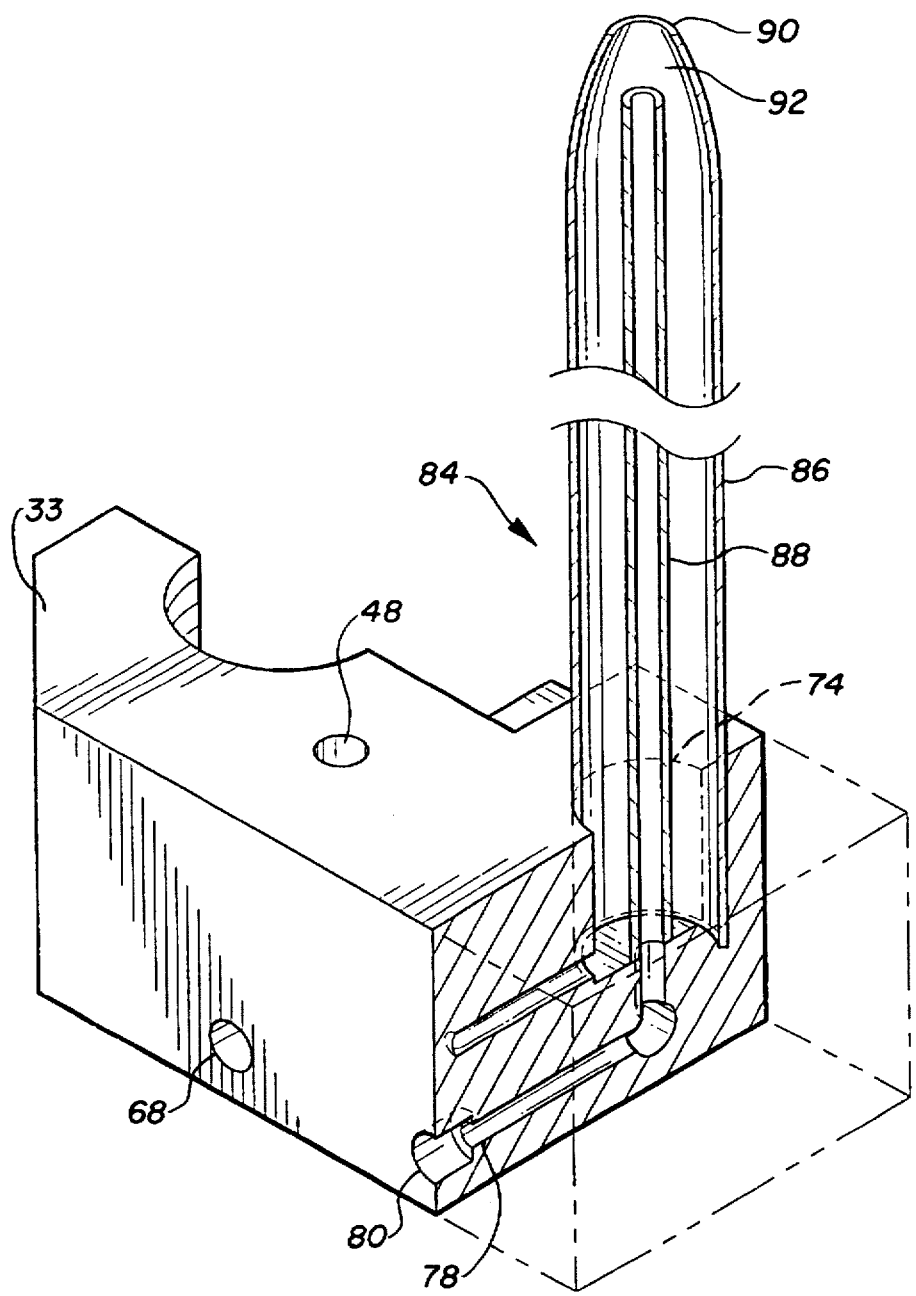
FIG. 13 is a perspective view of the part shown in FIG. 4 cut though the outlet of the mist unit.

Part 100 also includes a cooling liquid passage 78 passing therethrough. Cooling liquid passage 78 connects a cooling liquid inlet 80 with outlet 74. An inlet hose fitting 82 is screwed into cooling liquid inlet 80. A mist forming nozzle 84 is installed in outlet 74 as shown in FIG. 13. Nozzle 84 includes an outer tube 86 in communication with outlet passage 72 and an inner tube 88 in communication with cooling liquid passage 78. Nozzle 84 extends to the proximity of the work piece to be cooled and is preferably about 12 inches long. Outer tube 86 terminates at a small opening 90 in the tip 92 of nozzle 84. Inner tube 88 extends within outer tube 86 for substantially the entire length of outer tube 86. Inner tube 88 terminates proximate opening 90. Upon depression of button 58 and thus the opening of the control valve, high pressure air flows through inlet hose fitting 76, gas inlet 68, valve cavity 70, and through outlet passage 72 into the outer tube 86. The external fittings shown, nozzle 84 and hose fittings 76 and 84, are preferably brass fittings.

The high pressure air exits nozzle 84 at a high flow rate through opening 90. The flow of the high pressure gas through tip 92 produces suction drawing cooling liquid through inner tube 88. The high pressure air and cooling liquid are thus mixed at tip 92 to form a cooling mist which is expelled from opening 90 to cool a hot work piece.

Figure 6:
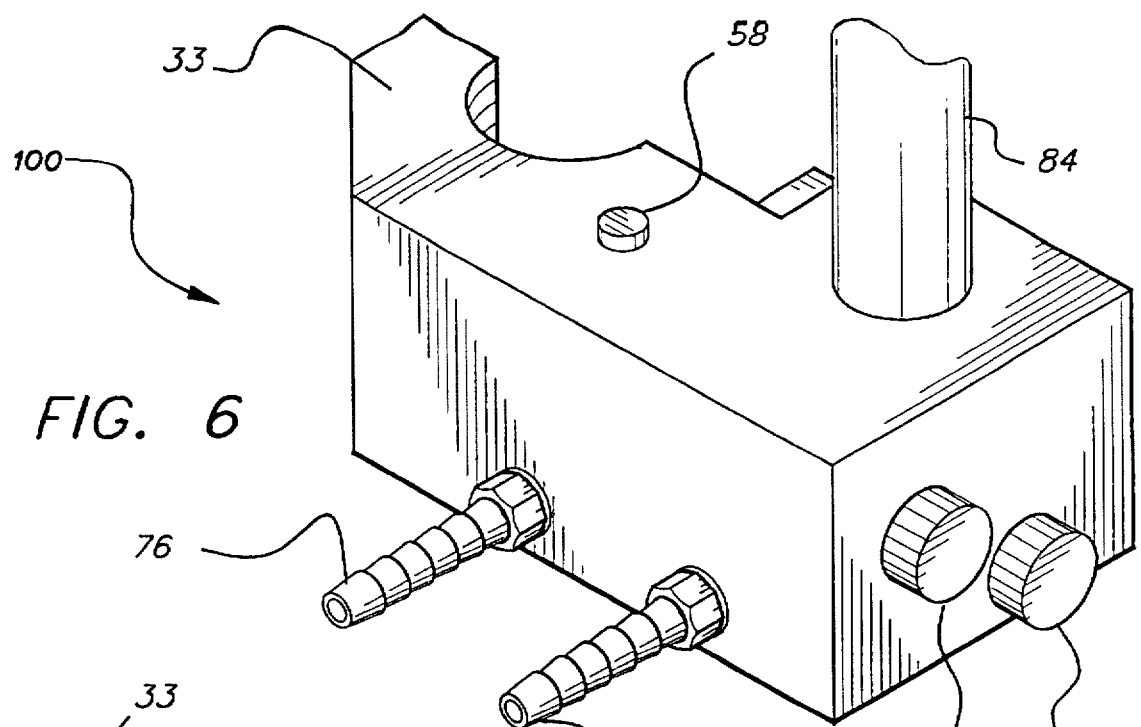
FIG. 6 is a bottom perspective view of the part shown in FIG. 4.
Figure 7:
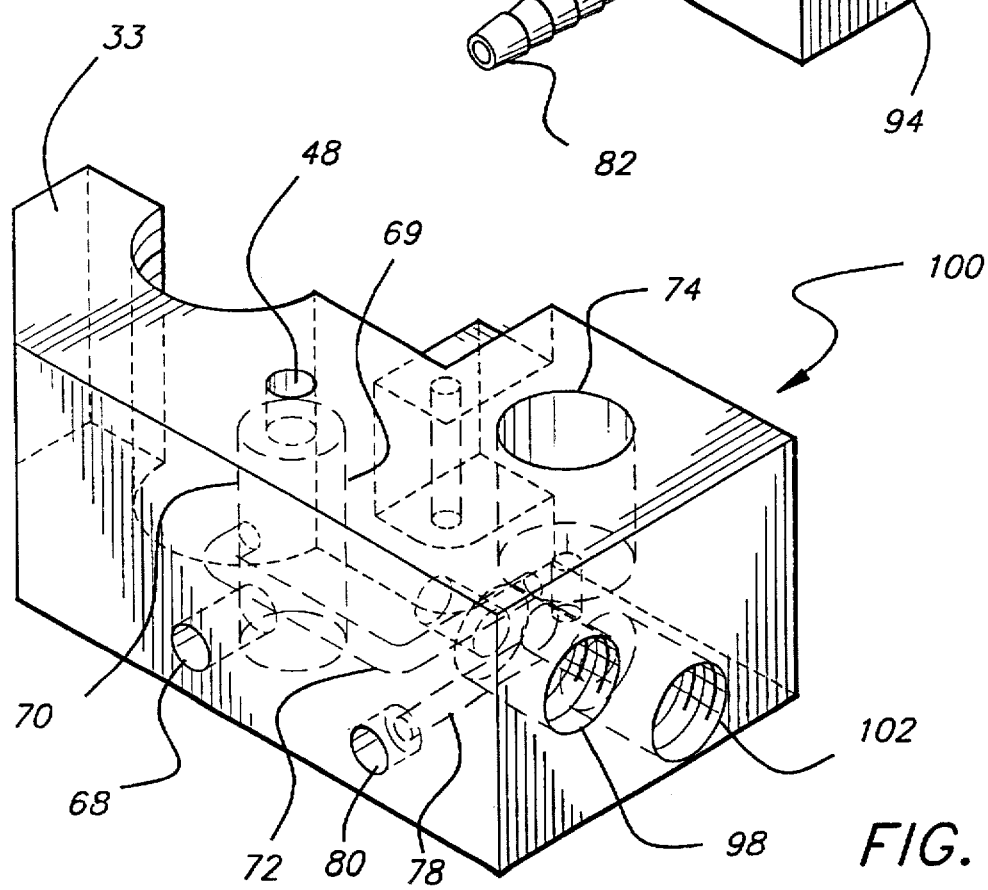
FIG. 7 is a bottom perspective view of the part shown in FIG. 4 showing the internal structure without external attachments.

Valves 94 and 96 may be included to adjust the relative flows of high pressure air and cooling liquid as shown in FIGS. 6 and 7. Valve 94 is installed in valve cavity 98 which intersects outlet passage 72. Valve 94 adjusts the flow of high pressure air. Valve 96 is installed in valve cavity 102 which intersects cooling liquid passage 78. Valve 98 adjusts the flow of cooling liquid. Valves 94 and 96 are commonly known threaded needle valves.

Part 100 is thus supplied with high pressure air through hose fitting 76 and cooling liquid through hose fitting 82. When this quill stop contacts the dog stop, tip 92 of nozzle 84 is positioned to spray cooling mist on a work piece to be cooled. The contact of this quill stop with the dog stop depresses button 58 thus opening the control valve. High pressure air flows through nozzle 84 which draws cooling liquid into tip 92 to form a cooling mist. The cooling mist is expelled through opening 90 onto the work piece to be cooled.

It is to be understood that the present invention is not limited to the sole embodiments described above, but encompasses any and all embodiments within the scope of the following claims.

I claim:

1. A fluid control quill stop for selective placement on a stop rod of a machine, the quill stop selectively restricting displacement of a quill of the machine by contacting a dog stop upon set maximum displacement of the quill, said quill stop comprising:

securing means for releasably attaching to a stop rod of a machine at a selected position, and control valve means for actuating fluid flow upon contact with a dog stop of the machine.

2. The fluid control quill stop according to claim 1 further comprising a body having a first fluid passage therethrough, said control valve means installed within said first fluid passage for controlling flow of fluid therethrough.

3. The fluid control quill stop according to claim 2 wherein said body includes a stopping surface for contacting the dog stop upon set maximum displacement of a quill of the machine, said stopping surface having a button passage passing therethrough, and said control valve means includes a button extending through said button passage, said button activating said control valve means upon depression.

4. The fluid control quill stop according to claim 3 wherein said first fluid passage includes a valve cavity having an inner side wall, and said control valve means comprises a valve element slidably disposed within said valve cavity, said button integrally attached to said valve element.

5. The fluid control quill stop according to claim 4 wherein said first fluid passage further includes an inlet in communication with said valve cavity, and an outlet in communication with said valve cavity between said. inlet and said button passage.

6. The fluid control quill stop according to claim 5 further including a first sealing means for preventing fluid from escaping from said valve cavity through said button passage, and a second sealing means for preventing fluid flow from said inlet to said outlet through said valve cavity unless said valve element has been displaced by depression of said button.

7. The fluid control quill stop according to claim 6 wherein said first sealing means comprises a first O-ring disposed around said valve element proximate to said button, and said second sealing means comprises a second O-ring disposed around said valve element distal from said button.

8. The fluid control quill stop according to claim 7 wherein said valve cavity includes a wide fluid passage chamber in communication with said inlet, and a narrow element chamber connecting said wide fluid passage chamber and said button passage;

whereby said second O-ring slides from said narrow element chamber into said wide fluid chamber upon depression of said button thereby permitting fluid flow between said inlet and said outlet.

9. The fluid control quill stop according to claim 7 wherein said inlet enters said valve cavity through said inner side wall whereby said second O-ring slides across said inlet upon depression of said button thereby permitting fluid flow between said inlet and said outlet.

10. The fluid control quill stop according to claim 2 further comprising a first adjustment valve installed within said first fluid passage for adjusting flow rate through said first fluid passage.

11. The fluid control quill stop according to claim 2 wherein said body further has a second fluid passage therethrough.

12. The fluid control quill stop according to claim 11 further including a second adjustment valve installed within said second fluid passage for adjusting flow rate through said second fluid passage.

13. The fluid control quill stop according to claim 11 further comprising a nozzle in communication with said first fluid passage and said second fluid passage, said nozzle for mixing high pressure air passing through said first fluid passage and cooling liquid passing through said second fluid passage to form a cooling mist.

14. The fluid control quill stop according to claim 1 further comprising a body wherein said securing means comprises a threaded bore passing through said body.

15. The fluid control quill stop according to claim 14 wherein said body has a tip, said body is divided into two parts along a plane passing through a central axis of said threaded bore, said body further includes a pivot joining said two parts, each of said two parts has a face extending from said pivot to said tip of said body, each said face includes half of said threaded bore, and said body includes biasing means for biasing said face of each of said two parts together.

16. The fluid control quill stop according to claim 15 wherein said body has a stopping surface, and said valve means including a button extending through said stopping surface, said button activating said valve upon depression.

17. The fluid control quill stop according to claim 15 wherein said each said part of said body includes a tail extending from said body in a direction away from said tip, and said biasing means comprises a spring disposed between said tail of each of said two parts.

18. A fluid control quill stop comprising:

a body having a tip, a stopping surface, and a threaded bore passing therethrough, said body divided into two parts along a plane passing through a central axis of said bore, said body including a pivot joining said two parts, each of said two parts having a face extending from said pivot to said tip of said body, each said face including a half of said threaded bore each of said two parts further including a tail extending away from said pivot in a direction away from said tip;

a spring disposed between each said tail of each of said two parts, said spring biasing each said face of each of said two parts together;

a valve cavity formed in said body including,
   an inlet,
   a wide fluid passage chamber in communication with said inlet,
   an outlet,
   a button passage passing through said stopping surface of said body,
   a narrow element chamber connecting said fluid passage chamber, said outlet, and said button passage; and a valve element disposed in said element chamber, said valve element including,
   a button extending through said button passage,
   a first O-ring disposed between said outlet and said button passage for forming a seal in said narrow element chamber for preventing fluid from escaping through said button passage, and
   a second O-ring opposite said button, said second O-ring preventing fluid flow from said inlet to said outlet by forming a seal in said narrow element chamber between said inlet and said outlet;

whereby contact of said stopping surface with an external dog stop depresses said button and forces said second O-ring into said wide fluid passage chamber thus permitting fluid flow between said inlet and said outlet.

19. The fluid flow quill stop according to claim 18 further comprising:

an outlet passage connecting said narrow element chamber with said. outlet;

a first needle valve installed within said outlet passage;

a cooling liquid passage through said body, said cooling liquid passage terminating at said outlet;

a second needle valve installed within said cooling liquid passage; and a nozzle attached to said outlet, said nozzle in communication with said outlet passage and said cooling liquid passage, said nozzle for mixing high pressure air passing through said valve cavity and cooling liquid passing through said cooling liquid passage to form a cooling mist.

* * * * *